(12) United States Patent
Kohtamaeki et al.

(10) Patent No.: US 11,258,247 B2
(45) Date of Patent: Feb. 22, 2022

(54) FAULT CLEARING CIRCUITRY

(71) Applicant: Eaton Intelligent Power Limited, Dublin (IE)

(72) Inventors: Tuomo Kohtamaeki, Helsinki (FI); Jari Arto Severi Uusitalo, Masala (FI)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/771,240

(22) PCT Filed: Dec. 11, 2018

(86) PCT No.: PCT/EP2018/084313
§ 371 (c)(1),
(2) Date: Jun. 10, 2020

(87) PCT Pub. No.: WO2019/115508
PCT Pub. Date: Jun. 20, 2019

(65) Prior Publication Data
US 2021/0175703 A1    Jun. 10, 2021

(30) Foreign Application Priority Data

Dec. 11, 2017    (GB) ...................................... 1720578

(51) Int. Cl.
*H02H 7/00*          (2006.01)
*H02H 7/122*         (2006.01)
*H02H 1/00*          (2006.01)

(52) U.S. Cl.
CPC .......... *H02H 7/122* (2013.01); *H02H 1/0007* (2013.01)

(58) Field of Classification Search
None
See application file for complete search history.

(56) References Cited

U.S. PATENT DOCUMENTS 3,262,018 A      7/1966   Frans et al.
3,963,960 A *    6/1976   Gallagher ............... H01J 17/14
                                                      361/3

(Continued)

FOREIGN PATENT DOCUMENTS

DE      202014105425 U1    12/2014
EP          1852951 A1     11/2007
(Continued)

*Primary Examiner* — Stephen W Jackson
(74) *Attorney, Agent, or Firm* — Leydig, Voit & Mayer, Ltd.

(57) ABSTRACT

A fault clearing circuitry provided for connecting to at least one electrical line transmitting power includes: an electrical energy storage; at least one controllable switch connectable between the electrical energy storage and at least one electric line; and a control circuit for monitoring the at least one electric line for a fault and to close the at least one controllable switch if a fault is detected. The electrical energy storage stores an amount of electrical energy dimensioned to be sufficient for releasing one or more circuit breakers or clearing one or more fuses in the at least one electrical line in order to clear the fault. The control circuit closes the at least one controllable switch if a fault is detected such that a discharging of the electrical energy stored in the electrical energy storage is incurred injecting a current pulse in the at least one electrical line.

15 Claims, 8 Drawing Sheets

(56) References Cited

U.S. PATENT DOCUMENTS

| | | | |
|---|---|---|---|
| 5,339,210 A | 8/1994 | Howell | |
| 6,201,721 B1 * | 3/2001 | Suranyi | H02J 1/00 363/144 |
| 11,063,425 B2 * | 7/2021 | Fan | H02H 1/0007 |
| 2007/0139831 A1 | 6/2007 | Park et al. | |
| 2014/0117759 A1 | 5/2014 | Reason et al. | |

FOREIGN PATENT DOCUMENTS

| | | |
|---|---|---|
| EP | 2290774 A1 | 3/2011 |
| EP | 2369715 A1 | 9/2011 |

* cited by examiner

FAULT CLEARING CIRCUITRY

CROSS-REFERENCE TO PRIOR APPLICATIONS

This application is a U.S. National Phase application under 35 U.S.C. § 371 of International Application No. PCT/EP2018/084313, filed on Dec. 11, 2018, and claims benefit to British Patent Application No. GB 1720578.2, filed on Dec. 11, 2017. The International Application was published in English on Jun. 20, 2019 as WO 2019/115508 under PCT Article 21(2).

FIELD

This specification relates to fault clearing circuitry, particularly for application in power inverters.

BACKGROUND

A power inverter, for example as applied in an Uninterruptible Power Supply (UPS) system or in electrical grids may be capable of clearing a fault such as short circuit or ground fault by supplying a higher than the nominal electric current for a limited time period in order to open electric fuses or circuit breakers by the overcurrent. The fault clearing capability of inverters i.e. the higher electric current is usually around 2-3 times the normal electric current. However, this may in many cases not be sufficient for opening distribution fuses or circuit breakers. To overcome this problem, the inverter could be over dimensioned to have a higher fault clearing capability and to supply much higher electric currents in case of a fault. However, this requires an oversizing and, thus, more technical resources than required for normal operation of an inverter.

The European patent application EP 2 290 774 A1 discloses a network protection device which is provided to protect an EPDN (Electric Power Distribution Network) against a current fault. The EPDN comprises a plurality of safety devices adapted to electrically isolate a part of the EPDN when the current through the safety device exceeds a predetermined activation threshold. The network protection device comprises: a buffer configured to be coupled in parallel to the EPDN being created by capacitors, and to store electric energy; a detector to detect a voltage in the EPDN; and a controller coupled to the buffer and the detector. The controller is configured to control, upon detecting a voltage dip in the EPDN which is representative of a short circuit condition in the EPDN by the detector, the buffer to discharge at least part of its stored electric energy into the EPDN, while generating a discharge current which is at least as high as to activate the safety device with the highest activation threshold in the EPDN. When a voltage dip has been detected, and the capacitors discharge at least part of their stored electric energy into the EPDN, semiconductor switches are controlled by the controller to generate a voltage having a frequency, phase and amplitude in the EPDN which existed before the voltage dip was detected.

US 2014/117759 A1 describes a control circuit and a method for controlling a control circuit. The control circuit is connected to at least two electrical loads connected in parallel. An electric melting metal fuse is connected in series with each electrical load. The method comprises: monitoring the total current provided to the electrical loads and in case the total current from the control circuit during normal operation exceeds a nominal preset current limit, providing one of: a first electric pulse to the loads during a preset first time period at a current which is higher than the nominal preset current limit, and a second electric pulse to the loads during a preset second time period.

DE 20 2014 105425 U1 discloses an arrangement for short-circuit protection of an electrical system, the electrical system comprising an energy store, a DC intermediate circuit and a DC converter connected therebetween, wherein the energy store is connected on a DC connection to the DC converter via a fuse, characterised in that the arrangement comprises switching means for switching the voltage of the DC intermediate circuit via the fuse in response to detection of a short-circuit in the electrical system.

SUMMARY

In an embodiment, the present invention provides a fault clearing circuitry provided for connecting to at least one electrical line transmitting power, comprising: an electrical energy storage; at least one controllable switch connectable between the electrical energy storage and at least one electric line; and a control circuit configured to monitor the at least one electric line for a fault and to close the at least one controllable switch if a fault is detected, wherein the electrical energy storage is configured to store an amount of electrical energy dimensioned to be sufficient for releasing one or more circuit breakers or clearing one or more fuses in the at least one electrical line in order to clear the fault, wherein the control circuit is configured to close the at least one controllable switch if a fault is detected such that a discharging of the electrical energy stored in the electrical energy storage is incurred injecting a current pulse in the at least one electrical line via the at least one controllable switch so that a higher current in the at least one electrical line is incurred for a limited time span so as to provide a time limited higher current, and wherein the time limited higher current may release the one or more circuit breakers or clear the one or more fuses in the at least one electrical line.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
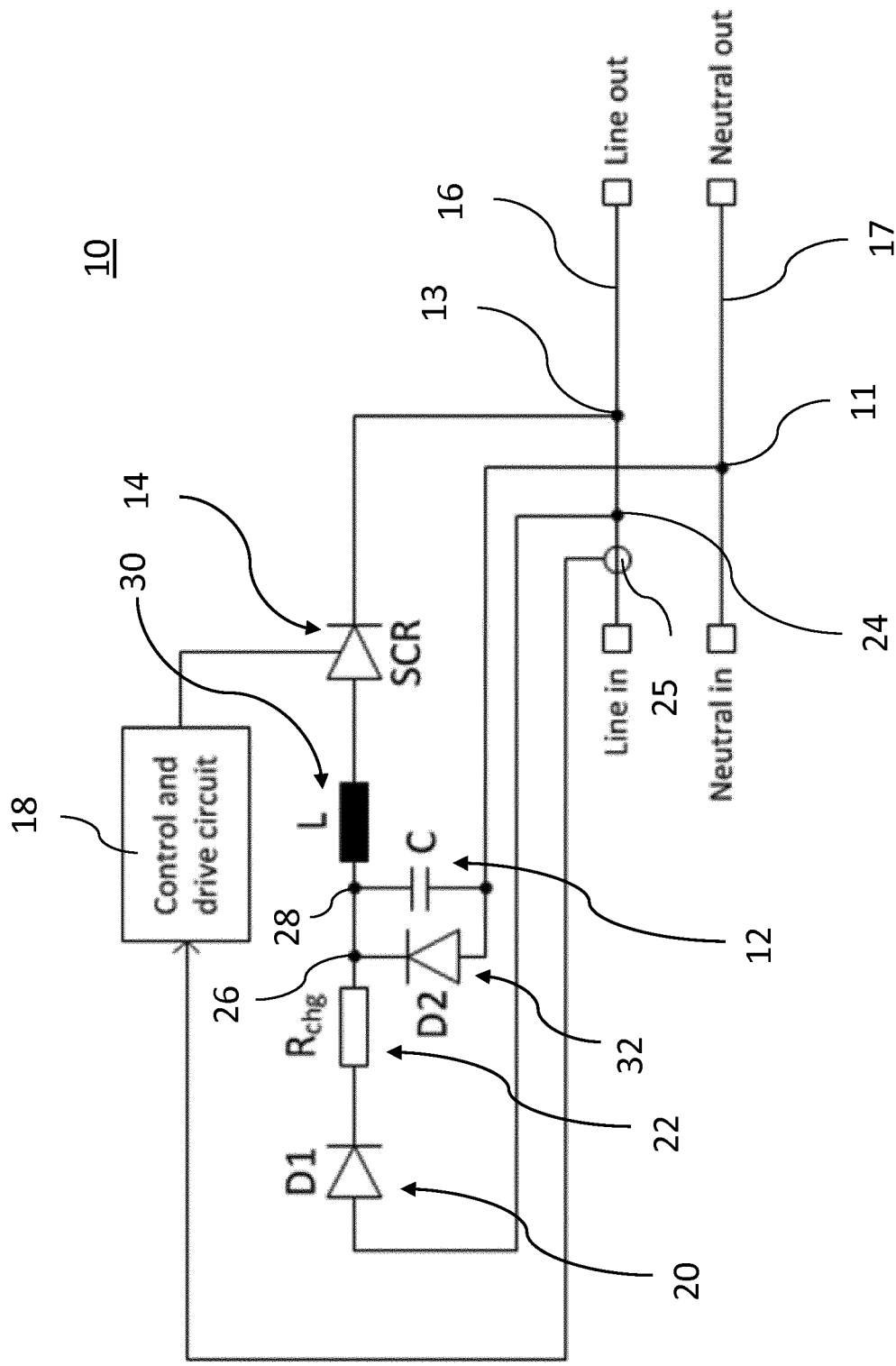
FIG. 1 shows an example of a fault clearing circuitry for a single phase.

This specification describes a fault clearing circuitry, which may be applied in power inverters and may eliminate the need of over dimensioning a power inverter for fault clearing.

According to an aspect of this specification, a fault clearing circuitry is disclosed. The circuitry comprises an electrical energy storage, at least one controllable switch connectable between the electrical energy storage and at least one electric line, and a control circuit configured to monitor the at least one electric line for a fault and to close the at least one switch if a fault is detected. The electrical energy storage is provided for storing an amount of electrical energy, which may be dimensioned to be sufficient for releasing one or more circuit breakers or clearing one or more fuses in the at least one electrical line in order to clear the fault. The control circuit is configured to close the at least one switch if a fault is detected such that a discharging of the electrical energy stored in the electrical energy storage causes a current pulse injected in the at least one electrical line so that a higher current in the at least one electrical line is incurred for a limited time span, wherein the time limited higher current may release the one or more circuit breakers or clear the one or more fuses in the at least one electrical line. For example, when the monitoring of the at least one electrical line detects a fault such as a short circuit, the control circuit may close the at least one controllable switch so that the stored electrical energy can be released. This release generates a current pulse, which may be particularly short and large, in a controlled manner. Thus, circuit breakers or fuses, which may be provided for circuit protection in the at least one electrical line, can then be activated by this pulse. For example, magnetic overcurrent circuit breakers may be released under an overcurrent condition, which is usually defined by a minimum overcurrent for a minimum time span. Thus, when the electrical energy storage is dimensioned to that the stored energy may fulfill the requirement of an overcurrent release of such a magnetic overcurrent circuit breaker, the fault clearing circuitry may protect the circuits coupled to the at least one electrical line by safely and quickly releasing the circuit breakers with the pulse generated in a controlled manner. Alternatively, a fuse will act due to an overcurrent or short circuit in order to open or clear the overcurrent or short circuit.

In some implementations, the fault clearing circuitry may comprise a charging circuitry for charging the electrical energy storage from one or more the at least one electric lines. For example, the charging circuitry may comprise a series connection of a diode and a resistor, wherein the series connection of the diode and resistor is connected with one terminal to the one of the at least one electric lines and with the other terminal to a charging terminal of the electrical energy storage.

In some implementations, the fault clearing circuitry may comprise an electric current rise limiter connected between the electrical energy storage and the at least one switch. For example, the limiter may be an inductor dimensioned such that the at least one controllable switch is protected from overcurrent.

In some implementations, the fault clearing circuitry may comprise a diode connected in parallel to the electrical energy storage and being provided to protect the electrical energy storage from reverse polarity.

In some implementations of the fault clearing circuitry, the electrical energy storage may be a capacitor and/or the at least one controllable switch may be a controllable semiconductor switch, particularly a silicon controlled rectifier or thyristor.

The at least one electrical switch may in an implementation comprise at least one silicon controlled rectifier with the anode being connected the electrical energy storage and the cathode being connectable to the at least one electric line. This allows to inject a positive current pulse from the electrical energy storage into the at least one electrical line. Alternatively or additionally, the at least one electrical switch may in an implementation comprise a silicon controlled rectifier with the cathode being connected the electrical energy storage and the anode being connectable to the at least one electric line. With this implementation, a negative current pulse can be injected from the electrical energy storage into the at least one electrical line. Both implementations can be combined in order to allow positive and/or negative current pulse(s) from the electrical energy storage into the at least one electrical line.

A further aspect of this specification relates to an electrical arrangement comprising at least one electrical line for transmitting electrical power, and a fault clearing circuitry disclosed in this specification and being connected between at least one of the electrical lines and a neutral line or connected between at least one of the electrical lines and at least another one of the electrical lines, wherein the control circuit is configured to monitor at least one of the electric lines for a fault and to close the at least one switch of the fault clearing circuitry if a fault is detected.

A further aspect of this specification relates to a power inverter with fault clearing capability comprising an electronic inverter circuit for converting direct current into alternating current, and a fault clearing circuitry disclosed in this specification.

In some implementations, the power inverter may be a two-level, a three-level or a multi-level inverter.

In some implementations of the power inverter, at least one component may be used by the electronic inverter circuit as well as by the fault clearing circuitry.

In the following, functionally similar or identical elements may have the same reference numerals. Absolute values are shown below by way of example only and should not be construed as limiting.

FIG. 1 shows a fault clearing circuitry 10 for a single phase electric line 16. The circuitry 10 may be for example applied to a single-phase UPS system for monitoring the UPS output for fault conditions such as short circuits and to assist in quickly disconnecting the fault from the UPS output by delivering a current pulse sufficient for opening a circuit breaker in case of an overcurrent condition.

The circuitry 10 comprises a storage for electrical energy implemented by a capacitor 12, a controllable switch implemented by a silicon controlled rectifier (SCR) 14, a control and drive circuit 18, a charging circuitry for charging the capacitor 12 implemented by a series connection of a diode 20 and a resistor 22, an electric current rise limiter implemented by an inductor 30, and a further diode 32 for protecting the capacitor 12 from reverse polarity. The circuitry 10 has a first terminal 11 provided for connection with a neutral electric line 17, a second terminal 13 and a third terminal 24 both provided for connection with the electrical line 16, and a monitoring terminal 25 of the control and drive circuit 18 provided for monitoring the electrical line 16.

The interconnection of the elements of circuitry 10 is described in the following: the further diode 32 is connected in parallel to the capacitor 12. The anode of the further diode 32 and one terminal of the capacitor 12 form the first terminal 11 of the circuitry 10. The cathode of the diode 32 and the charging terminal 28 of the capacitor 12 are connected to an interconnection of one terminal 26 of the resistor 22 and the inductor 30. The other terminal of resistor 22 is connected to the cathode of the diode 20, and the anode of the diode 20 forms the third terminal 24. It is also possible to exchange the positions of diode 20 and resistor 22. The inductor 30 is connected between the charging terminal 28 and the anode of the SCR 14. The cathode of the SCR 14 forms the second terminal 13. The gate of the SCR 14 is driven by the output of the control and drive circuit 18 depending on the conditions at the monitoring terminal 25.

The operation of the circuitry 10 is described in the following: the capacitor 12 is charged with electrical energy from the electrical line 16 via the diode 20 and the resistor 22. The control and drive circuit 18 monitors via the monitoring terminal 25, for example connected with a current sensor for sensing the electric current flowing through the electrical line 16, the electrical conditions of line 16. The control circuit may also be comprised by the UPS control circuit, or it may accept an external control signal (for example from an UPS control circuit). When a fault condition is monitored, for example an overcurrent due to a short circuit, the control and drive circuit 18 sends a firing signal to the gate of the SCR 14 in order to turn on the SCR 14. This incurs a discharging of the electrical energy stored in the capacitor 12 via the inductor 30, which limits the current rise through the SCR 14. The discharging causes a current pulse injected in electrical line 16 via the second terminal 13, which incurs a higher current in electrical line 16 for a limited time span particularly determined by the capacity of the capacitor 12 and inductance of inductor 30 and the impedance of the fault. The time limited higher current in line 16 may cause release of circuit breakers provided for opening in case of an overcurrent in line 16.

Figure 2:
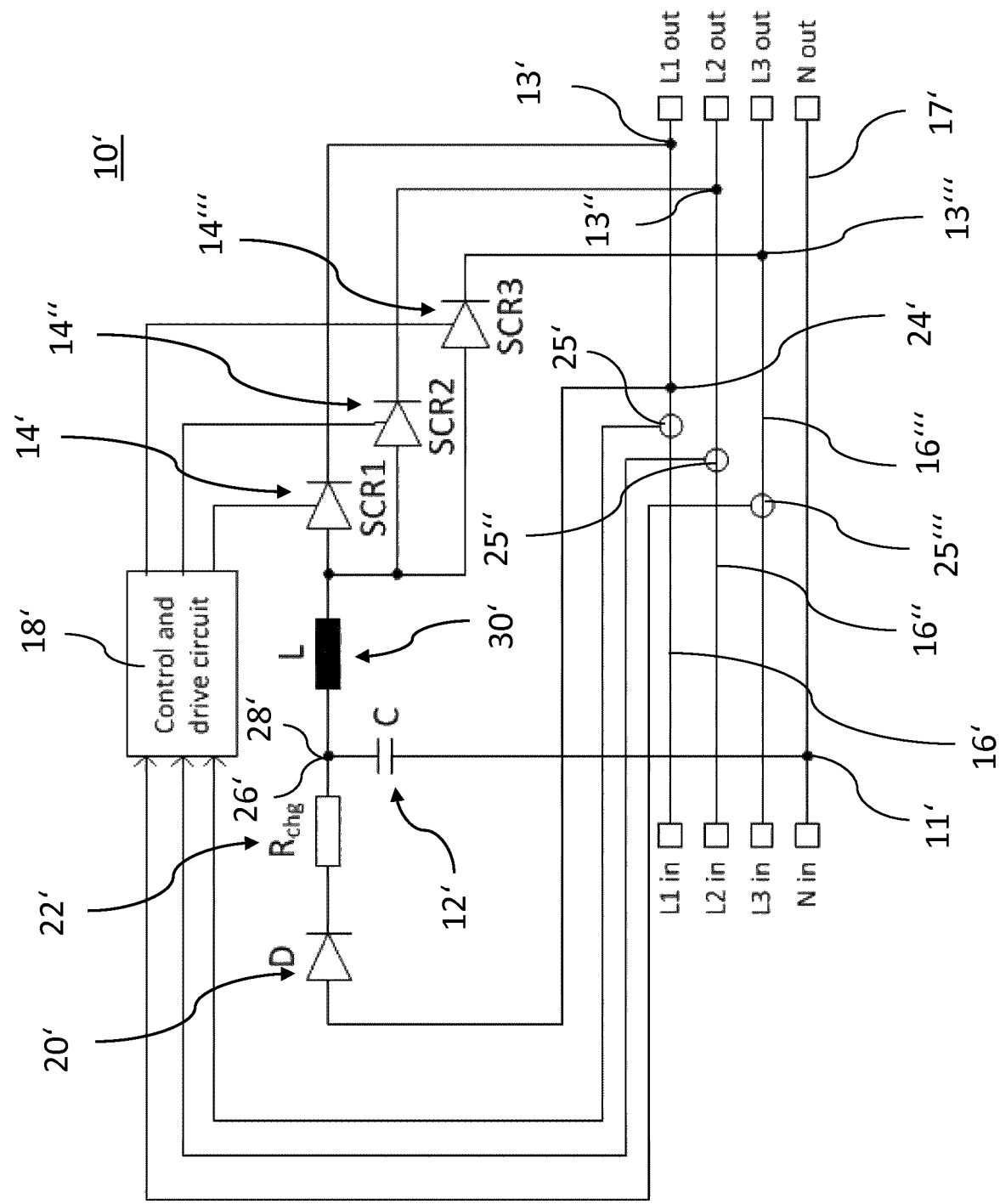
FIG. 2 shows an example of a fault clearing circuitry for three phases.

FIG. 2 shows a fault clearing circuitry 10' for a three phases electric lines 16', 16", 16'". The circuitry 10' may be for example applied to a three phase UPS system for monitoring the UPS output for fault conditions such as short circuits and to assist in quickly disconnecting the UPS output by delivering a current pulse sufficient for opening a circuit breaker in case of an overcurrent condition.

The circuitry 10' comprises a storage for electrical energy implemented by a capacitor 12', three controllable switches each implemented by a silicon controlled rectifier (SCR) 14', 14", 14'", a control and drive circuit 18', a charging circuitry for charging the capacitor 12' implemented by a series connection of a diode 20' and a resistor 22', and an electric current rise limiter implemented by an inductor 30'. The circuitry 10' has a first terminal 11' provided for connection with a neutral electric line 17', three second terminals 13', 13", 13'" each provided for connection with one of the electrical lines 16', 16", 16'", a third terminal 24' provided for connection one of the electrical lines 16', 16", 16'", and three monitoring terminals 25', 25", 25'" of the control and drive circuit 18' provided for monitoring the electrical lines 16', 16", 16'".

The interconnection of the elements of circuitry 10' is described in the following: one terminal of the capacitor 12' form the first terminal 11' of the circuitry 10'. The charging terminal 28' of the capacitor 12' is connected to an interconnection of one terminal 26' of the resistor 22' and the inductor 30'. The other terminal of resistor 22' is connected to the cathode of the diode 20', and the anode of the diode 20' forms the third terminal 24'. It is also possible to exchange the positions of diode 20' and resistor 22'. The inductor 30' is connected between the charging terminal 28' and the anodes of the SCRs 14', 14", 14'". The cathodes of the SCRs 14', 14", 14'" form the second terminals 13', 13", 13'". The gates of the SCRs 14', 14", 14'" are driven by respective outputs of the control and drive circuit 18' depending on the conditions at the monitoring terminals 25', 25", 25'".

The operation of the circuitry 10 is described in the following: the capacitor 12' is charged with electrical energy from the electrical line 16' via the diode 20' and the resistor 22'. The control and drive circuit 18' monitors via the monitoring terminals 25', 25", 25'", for example connected with current sensors for sensing the electric currents flowing through the electrical lines 16', 16", 16'", the electrical conditions of lines 16', 16", 16". When a fault condition is monitored on one or more of the monitored electrical lines 16', 16", 16'", for example an overcurrent due to a short circuit, the control and drive circuit 18' sends a firing signal to the gate of one of the SCRs 14', 14" or 14'" in order to turn on the respective SCR 14', 14" or 14'". This incurs a discharging of the electrical energy stored in the capacitor 12' via the inductor 30', which limits the current rise through the SCR 14', 14" or 14'". The discharging causes a current pulse injected in the respective electrical line 16', 16", 16'" via the respective second terminal 13', 13", 13'", which incurs a higher current in the respective electrical line 16', 16", 16'" for a limited time span particularly determined by the capacity of the capacitor 12' and inductance of inductor 30' and the impedance of the fault. The time limited higher current in one of lines 16', 16", 16'" may cause release of circuit breakers provided for opening in case of an overcurrent in lines 16', 16", 16'".

Figure 3:
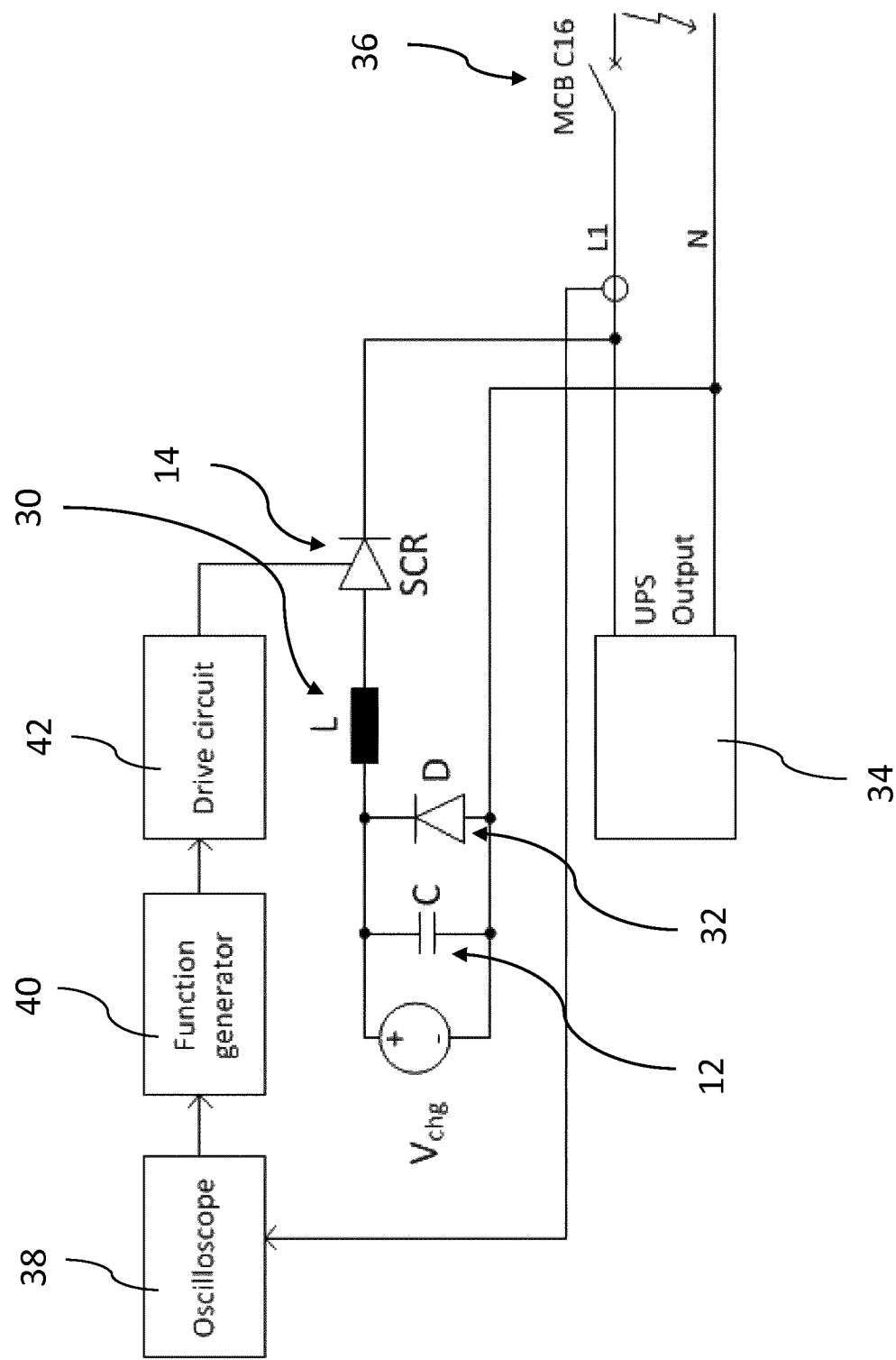
FIG. 3 shows an example of a test arrangement for a fault clearing circuitry for a single phase.

A prototype of the single-phase fault clearing circuitry was tested in a laboratory with the test arrangement shown in FIG. 3. It was tested in one output phase of a 20 kVA three-phase UPS 34. The UPS output was protected with a C16 miniature circuit breaker 36 and a fault was applied after the breaker 36. The capacitor used in the test arrangement was 1500 uF/450V capacitor, charged to 200 V. The inductor value was 300 µH.

The oscilloscope trigger was set to the UPS output current, and when the output was short-circuited, the trigger level was reached, and the oscilloscope trigger signal was used to drive the SCR 14. The driving or firing signal for the SCR 14 was generated by a function generator 40 and a drive circuit 42. The oscilloscope captures shown in FIGS. 4 to 6 compare the UPS short circuit performance with and without the fault clearing circuitry in use.

Figure 4:
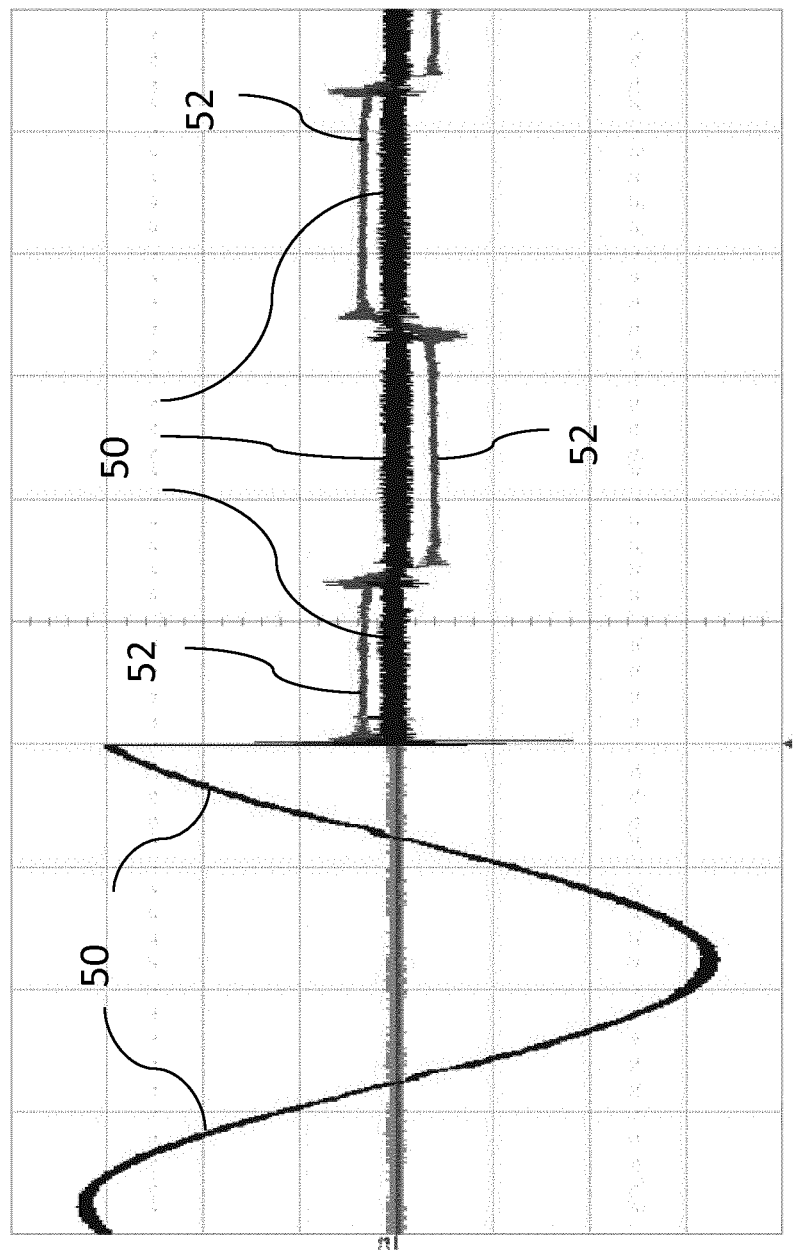
FIG. 4 is an oscilloscope capture showing the voltage and current when a fault occurs in a system without a fault clearing circuitry.

FIG. 4 shows the normal UPS 34 without a fault clearing circuitry trying to clear the fault behind C16 breaker 36. The current is not enough to clear the fault and the UPS 34 will shut down after 300 milliseconds.

Oscilloscope channels: 50: Output voltage L1-N; 52: Current to the fault.

Figure 5:
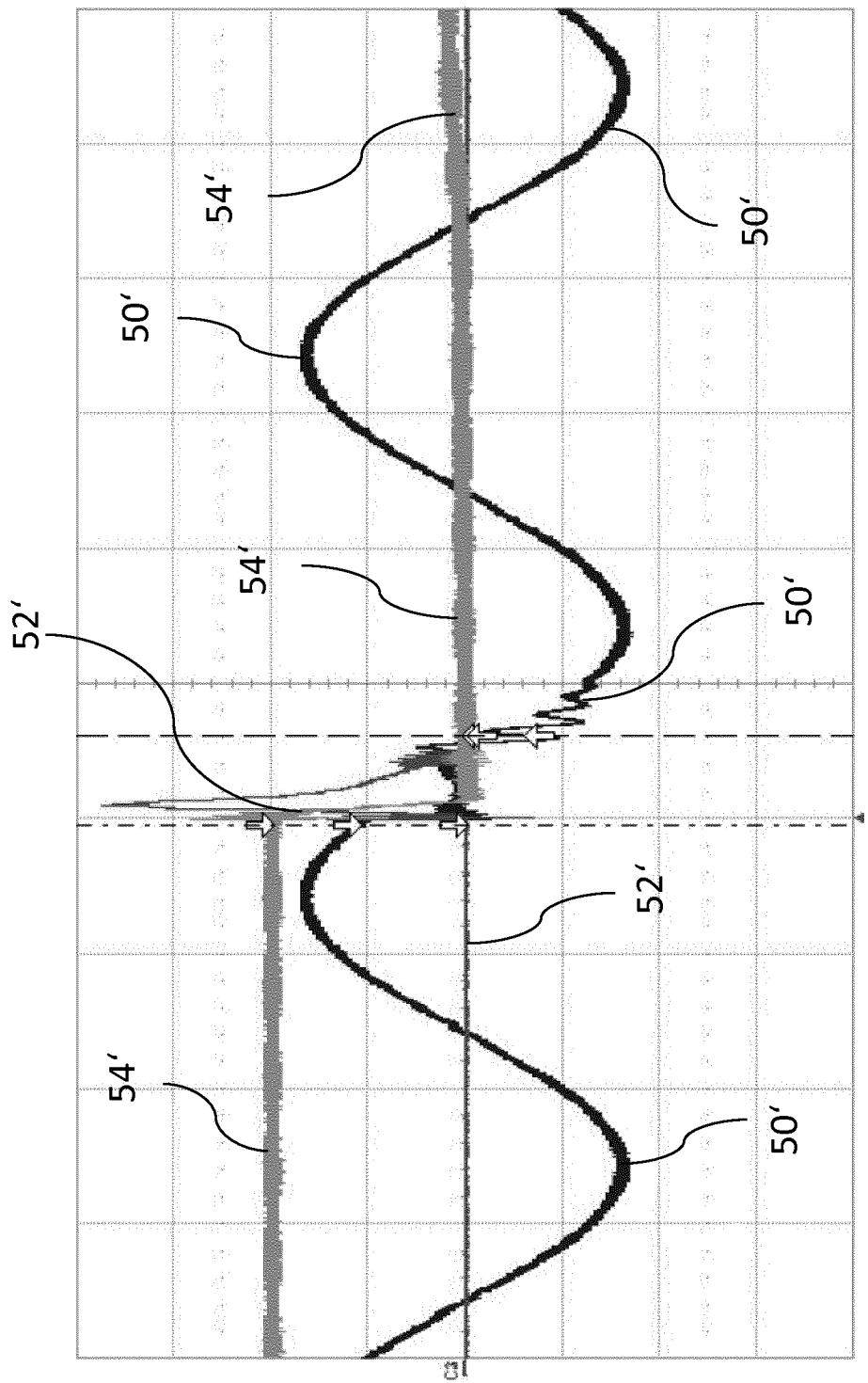
FIG. 5 is an oscilloscope capture showing the voltage and current when a fault occurs in a system equipped with the fault clearing circuitry during a positive cycle of the sinusoid output voltage of the system.
Figure 6:
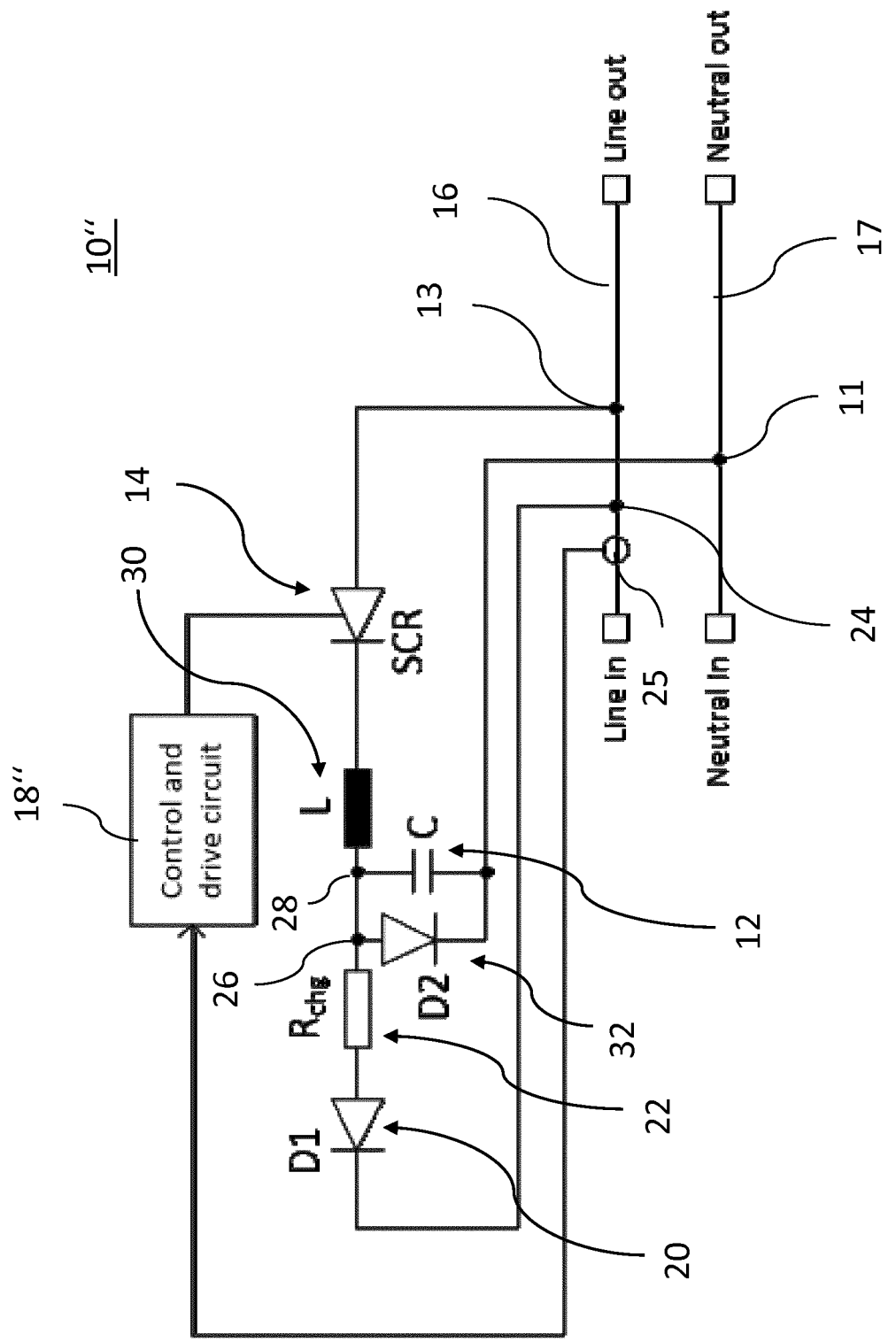
FIG. 6 shows a second example of a fault clearing circuitry for a single phase.

FIG. 5 shows the UPS 34 equipped with the circuitry clearing the fault behind the same C16 breaker 36. Here the interruption in the output voltage only lasts for 3 milliseconds. The scaling of the output voltage 50' is different in this figure, but the scaling of the current 52' is the same.

Oscilloscope channels: 50': Output voltage L1-N; 52': Current to the fault; 54': voltage of the capacitor C12 in the circuitry.

FIG. 6 shows a fault clearing circuitry 10" for a single phase electric line 16 with negative polarity. The circuitry 10'" is similar to the circuitry 10 shown in FIG. 1, however, with a different polarity. Due to this, the diodes D1, D2 and the SCR are connected in a reverse direction in contrast to the circuitry 10 of FIG. 1. All other elements are the same.

The control and drive circuit 18″ monitors via the monitoring terminal 25, for example connected with a current sensor for sensing the electric current flowing through the electrical line 16, the electrical conditions of line 16. When a fault condition is monitored, for example an overcurrent due to a short circuit, the control and drive circuit 18″ sends a firing signal to the gate of the SCR 14 in order to turn on the SCR 14. This incurs a discharging of the electrical energy stored in the capacitor 12 via the inductor 30, which limits the current rise through the SCR 14. The discharging causes a negative current pulse injected in electrical line 16 via the second terminal 13, which incurs a higher current in electrical line 16 for a limited time span particularly determined by the capacity of the capacitor 12 and inductance of inductor 30 and the impedance of the fault. The time limited higher current in line 16 may cause release of circuit breakers provided for opening in case of an overcurrent in line 16.

Figure 7:
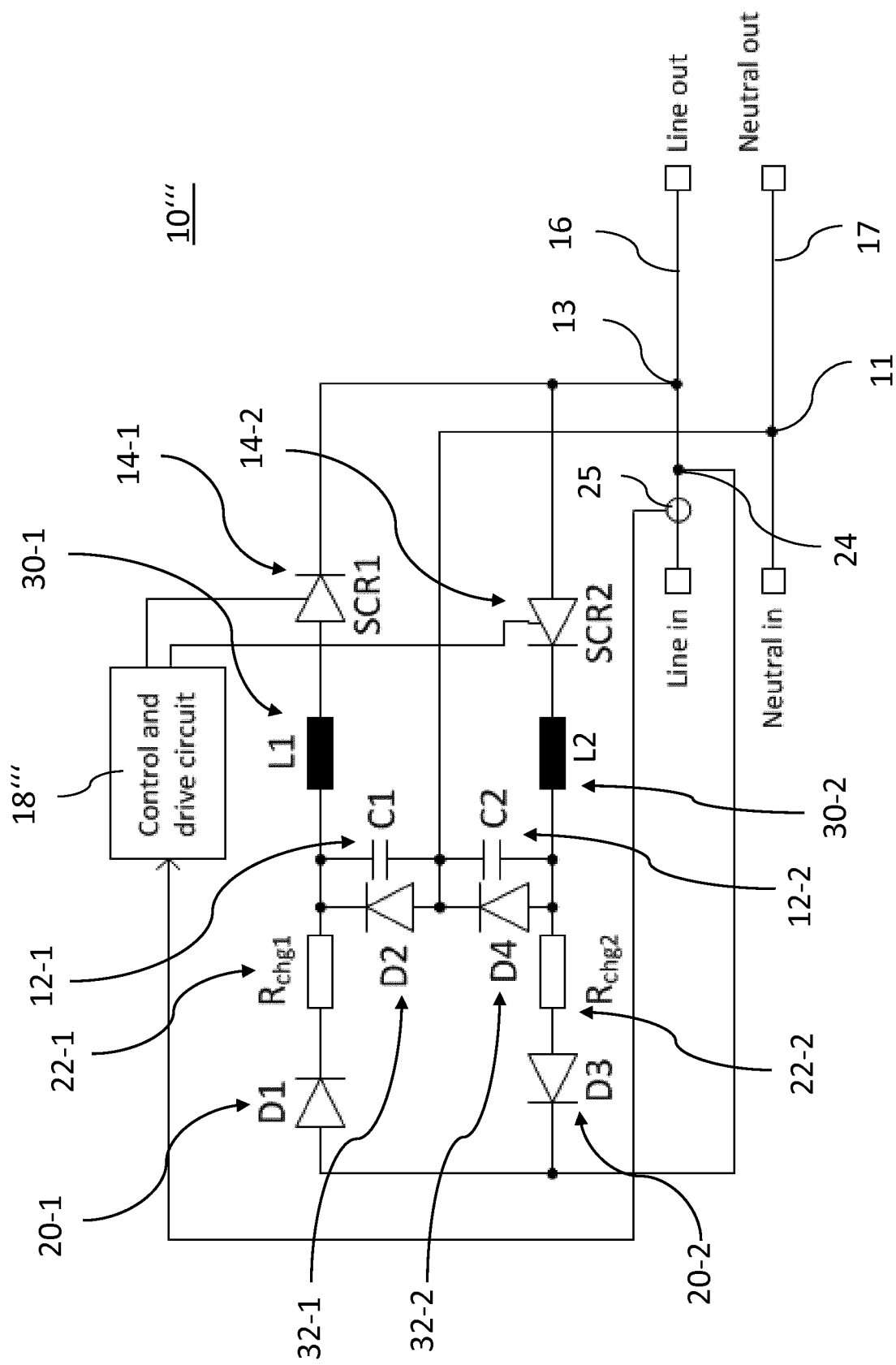
FIG. 7 shows a third example of a fault clearing circuitry for a single phase.

FIG. 7 shows a fault clearing circuitry 10‴ for a single phase electric line 16 with positive and negative polarity. The circuitry 10‴ is a combination of the circuitry 10 of FIG. 1 and the circuitry 10″ of FIG. 6. The circuitry 10‴ is suitable to inject a positive or a negative current pulse in the electrical line 16. The control and drive circuit 18‴ monitors via the monitoring terminal 25, for example connected with a current sensor for sensing the electric current flowing through the electrical line 16, the electrical conditions of line 16. When a fault condition is monitored, for example an overcurrent due to a short circuit, the control and drive circuit 18‴ sends a firing signal to the gate of either the SCR 14-1 or 14-2 in order to turn on the SCR 14-1 or 14-2, respectively, depending on the fault condition. The turning on of either the SCR 14-1 or the SCR 14-2 incurs a discharging of the electrical energy stored in the capacitor 12-1 or 12-2 via the inductor 30-1 or 30-2, which limits the current rise through the SCR 14-1 or 14-2. The discharging causes either a positive current pulse via SCR 14-1 or a negative current pulse via SCR 14-2 injected in electrical line 16 via the second terminal 13, which incurs a higher current in electrical line 16 for a limited time span particularly determined by the capacity of the capacitor 12 and inductance of inductor 30 and the impedance of the fault. The time limited higher current in line 16 may cause release of circuit breakers provided for opening in case of an overcurrent in line 16.

Figure 8:
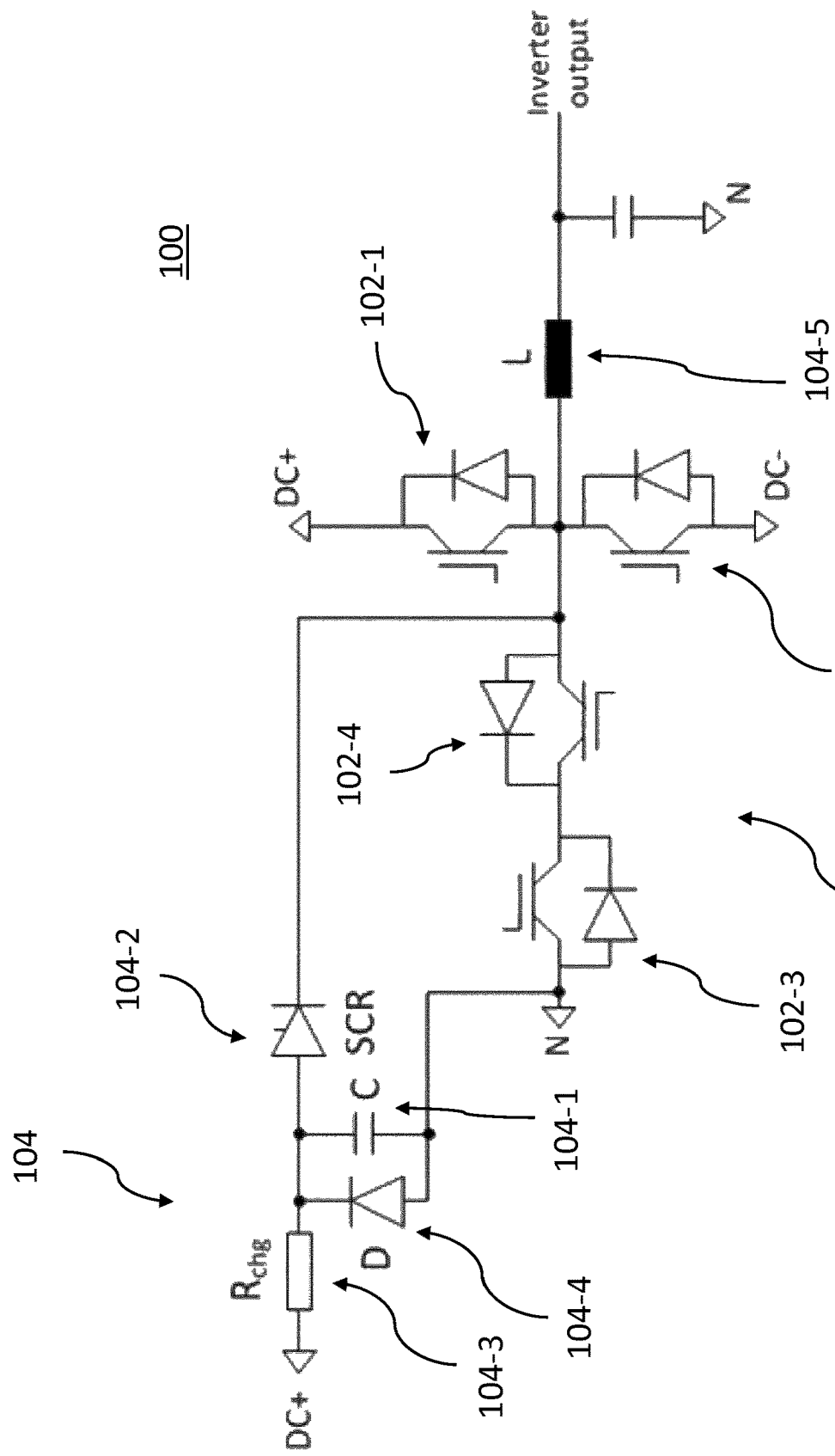
FIG. 8 shows an example of a three-level power inverter with fault clearing capability for a single phase.

The proposed topology can be further simplified, if the fault clearing circuitry is integrated with an inverter main circuit. FIG. 8 shows a possible integration 100 of the circuitry 104 with a single phase of a three-level inverter 102. The control and drive circuit is omitted from this figure.

The three-level inverter 102 comprises four switching elements 102-1 to 102-4 each comprising an IGBT with an anti-parallel connected diode. The switching elements 102-1 to 102-4 are connected to form a three-level T-type inverter topology. The fault clearing circuitry 104 comprises a capacitor 104-1 as electrical energy storage, a SCR 104-2 as controllable switch, a resistor 104-3 for limiting the charging current of the capacitor 104-1, and a diode 104-4 for protection of the capacitor 104-1 from reverse polarity. The neutral electrical line is designated with N, and the positive pole of the input voltage with DC+ and the negative pole of the input voltage with DC−. The output of the SCR 104-2 is connected to the interconnection point of the three switching elements 102-1, 102-2, and 102-4. As can be seen in FIG. 8, when the fault clearing circuitry is integrated with the inverter, the inductor 104-5 can be shared. With the integrated design, the switching of the main circuit components should be paused during the firing of the SCR 104-2. The figure above shows integration with three-level T-type inverter topology, but the circuitry can be used with many other inverter topologies as well, for example with a three-level NPC (I-type) and traditional two-level inverters.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A fault clearing circuitry provided for connecting to at least one electrical line for transmitting power, comprising:
   an electrical energy storage;
   at least one controllable switch connectable between the electrical energy storage and the at least one electric line, wherein the at least one electric line transmits power external to the fault clearing circuitry; and
   a control circuit configured to monitor the at least one electric line for a fault and to close the at least one controllable switch if a fault is detected,
   wherein the electrical energy storage is configured to store an amount of electrical energy dimensioned to be sufficient for releasing one or more circuit breakers or clearing one or more fuses in the at least one electrical line in order to clear the fault,
   wherein the control circuit is configured to close the at least one controllable switch if a fault is detected such that a discharging of the electrical energy stored in the electrical energy storage is incurred injecting a current pulse in the at least one electrical line via the at least one controllable switch so that a higher current in the at least one electrical line is incurred for a limited time span so as to provide a time limited higher current, and
   wherein the time limited higher current releases the one or more circuit breakers or clears the one or more fuses in the at least one electrical line.

2. The fault clearing circuitry of claim 1, further comprising:
   a charging circuitry configured to charge the electrical energy storage from one or more of the at least one electric lines.

3. The fault clearing circuitry of claim 2, wherein the charging circuitry comprises a series connection of a diode and a resistor, and
wherein the series connection of the diode and resistor is connected with one terminal to the one of the at least one electric lines and with the other terminal to a charging terminal of the electrical energy storage.

4. The fault clearing circuitry of claim 1, further comprising:
an electric current rise limiter connected between the electrical energy storage and the at least one controllable switch.

5. The fault clearing circuitry of claim 4, wherein the electric current rise limiter comprises an inductor dimensioned such that the at least one controllable switch is protected from overcurrent.

6. The fault clearing circuitry of claim 1, further comprising:
a diode connected in parallel to the electrical energy storage and being configured to protect the electrical energy storage from reverse polarity.

7. The fault clearing circuitry of claim 1, wherein the electrical energy storage comprises a capacitor and/or the at least one controllable switch comprises a controllable semiconductor switch comprising a silicon controlled rectifier or thyristor.

8. The fault clearing circuitry of claim 7, wherein the at least one electrical controllable switch comprises at least one silicon controlled rectifier with an anode being connected to the electrical energy storage and a cathode being connectable to the at least one electric line.

9. The fault clearing circuitry of claim 7, wherein the at least one electrical controllable switch comprises a silicon controlled rectifier with a cathode being connected to the electrical energy storage and an anode being connectable to the at least one electric line.

10. An electrical arrangement, comprising:
at least one electrical line for transmitting electrical power; and
the fault clearing circuitry according to claim 1 being connected between at least one of the electrical lines and a neutral line,
wherein the control circuit is configured to monitor at least one of the electric lines for a fault and to close the at least one switch of the fault clearing circuitry if a fault is detected.

11. An electrical arrangement, comprising:
at least one electrical line for transmitting electrical power; and
the fault clearing circuitry according to claim 1 being connected between at least one of the electrical lines and at least another one of the electrical lines,
wherein the control circuit is configured to monitor at least one of the electric lines for a fault and to close the at least one switch of the fault clearing circuitry if a fault is detected.

12. A power inverter with fault clearing capability, comprising:
an electronic inverter circuit configured to convert direct current into alternating current; and
the fault clearing circuitry of claim 1.

13. The power inverter of claim 12, wherein the power inverter comprises a two-level inverter or a three-level or multi-level inverter.

14. The power inverter of claim 12, wherein at least one component is used by the electronic inverter circuit and by the fault clearing circuitry.

15. An electrical arrangement, comprising:
at least one electrical line for transmitting electrical power; and
fault clearing circuitry connected between at least one of the electrical lines and a neutral line, the fault clearing circuitry comprising:
an electrical energy storage;
at least one controllable switch connectable between the electrical energy storage and at least one electric line; and
a control circuit configured to monitor the at least one electric line for a fault and to close the at least one controllable switch if a fault is detected,
wherein the electrical energy storage is configured to store an amount of electrical energy dimensioned to be sufficient for releasing one or more circuit breakers or clearing one or more fuses in the at least one electrical line in order to clear the fault,
wherein the control circuit is configured to close the at least one controllable switch if a fault is detected such that a discharging of the electrical energy stored in the electrical energy storage is incurred injecting a current pulse in the at least one electrical line via the at least one controllable switch so that a higher current in the at least one electrical line is incurred for a limited time span so as to provide a time limited higher current,
wherein the time limited higher current may release the one or more circuit breakers or clear the one or more fuses in the at least one electrical line, and
wherein the control circuit is configured to monitor at least one of the electric lines for a fault and to close the at least one switch of the fault clearing circuitry if a fault is detected.

* * * * *